United States Patent [19]

Drake

[11] 4,210,575

[45] Jul. 1, 1980

[54] ANTI-CORROSION COMPOSITIONS

[75] Inventor: Cyril F. Drake, Harlow, England

[73] Assignee: International Standard Electric Corporation, New York, N.Y.

[21] Appl. No.: 912,129

[22] Filed: Jun. 2, 1978

[30] Foreign Application Priority Data

Jun. 3, 1977 [GB] United Kingdom ............... 23790/77

[51] Int. Cl.² ................................................ C08K 3/32
[52] U.S. Cl. ............................... 260/42.52; 106/14.44
[58] Field of Search .................... 260/42.52; 106/47 R, 106/14.12, 14.44

[56] References Cited

U.S. PATENT DOCUMENTS

| 3,615,758 | 10/1971 | McMillan et al. | 106/47 R |
| 3,732,181 | 5/1973 | Ray et al. | 260/42.52 |
| 3,885,973 | 5/1975 | Ray et al. | 106/47 R |

Primary Examiner—Lewis T. Jacobs
Attorney, Agent, or Firm—James B. Raden; Harold J. Holt

[57] ABSTRACT

An anti-corrosion paint composition includes a glass material based on a silica type glass and containing zinc and phosphate ions which are leached into an aqueous solution.

5 Claims, 1 Drawing Figure

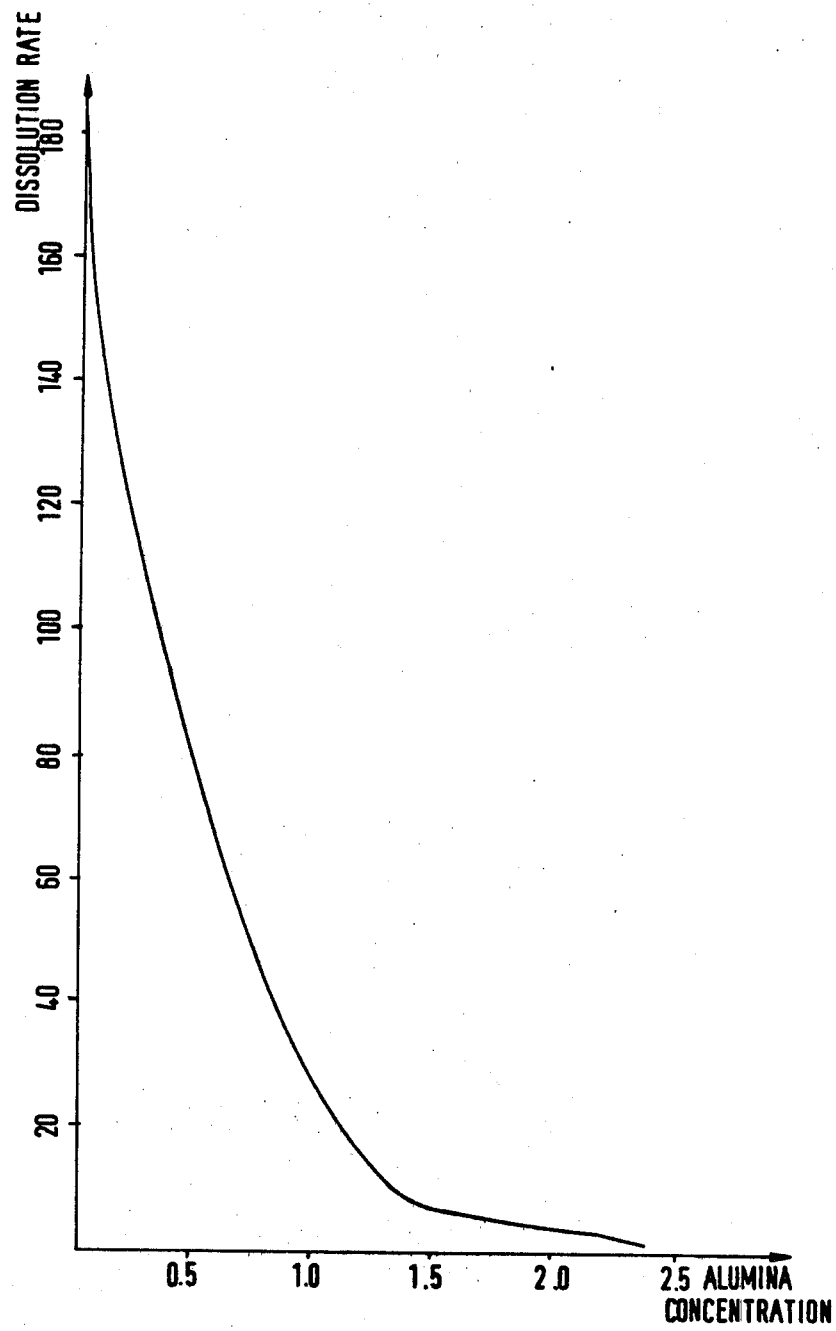

ANTI-CORROSION COMPOSITIONS

This invention relates to anti-corrosion compositors for the protection of metal surfaces, and in particular to a material containing zinc phosphate as the active material.

It is well known that the presence of a combination of $Zn^{++}$ and $PO_4^{---}$ ions in an aqueous media is very effective in inhibiting corrosion of iron on steel surfaces. However, the materials at present available for this purpose are limited to the few stoichiometric zinc phosphates that can be made. These have unsuitable water solubilities for long term protection of a metal surface and the pH of the salt solution is generally not the optimum value for the provision of adequate passivation of the metal.

The object of the invention is to minimise or to overcome this disadvantage.

According to one aspect of the invention there is provided a paint composition adapted to inhibit corrosion of a metal surface to which it is applied, the composition including a glass material dispersed in a resin carrier, in which said glass comprises, as its major constituents, phosphorous pentoxide ($P_2O_5$) and zinc oxide (ZnO), which together form the glass forming oxide and glass modifying oxide respectively of the glass, together with a minor proportion of one or more oxides of an element or elements of Group IIA or Group IIIB of the periodic table, the composition of the glass being such that, when the glass is contacted with water, zinc and phosphate ions leach into solution.

According to another aspect of the invention there is provided a water soluble glass material, including as its major constituents phosphorous pentoxide and zinc oxide, which together form the glass forming oxide and glass modifying oxide respectively of the glass, together with a minor proportion of one or more oxides of an element or elements of Group IIA or Group IIIB of the periodic table, the composition of the glass being such that, when the glass is contacted with water, zinc and phosphate ions are leached into solution.

The single figure of the drawing illustrates graphically the dissolution rate of the glass as a function of the alumina concentration.

The glasses employed in the paint composition are characterised by the fact that they can be prepared as single-phase solid structures which provide a continuous range of compositions. Thus it is possible to produce zinc phosphate glasses with any composition with a range of compositions.

The paint composition is particularly effective in the corrosion protection of iron or steel surfaces. The phosphate ions react with the metal surface to provide a protective impervious phosphate layer.

The solubility of the glass material is a function primarily of the proportion of the Group IIA or IIIB metal oxide or oxides in the glass. A suitable oxide for this purpose is aluminium oxide ($Al_2O_3$) which, when incorporated in the glass, decreases its water solubility to a level at which long term corrosion protection may be provided.

The glass is formed by co-melting its constituent compounds for a sufficient time to obtain an homogeneous material after which the melt is allowed to cool and to solidify and is ground into powder. The powder is then dispersed in a resin, e.g. an acrylic resin, together, if required, with powdered paint pigment materials to form the finished paint. If the paint is to be used in marine applications a glass biocide material, such as that described in our co-pending U.S. application Ser. No. 645,484, now U.S. Pat. No. 4,042,402 may also be incorporated in the paint composition.

Suitable material oxides for modifying the solubility of the glass material include alumina ($Al_2O_3$), MO where M is an element of Group IIA of the periodic table, ferric oxide ($Fe_2O_3$), gallium oxide ($Ga_2O_3$) and titanium dioxide ($TiO_2$) which all decrease the water solubility of the glass composition. In applications where it is desirable to enhance the solubility of the glass, this may be achieved by the incorporation of one or more alkali metal oxides. The metal oxide content of the glass also defines the pH of the resulting solution. Thus an increase in the proportion of acidic glass forming oxides reduces the pH and vice versa.

The following examples illustrate the invention.

EXAMPLE 1

A series of glasses was prepared from zinc oxide, phosphorus pentoxide and alumina. The dissolution rates of these materials were measured and the results are summarised in the following Table.

Table 1

| ZnO mole % | $P_2O_5$ mole % | $Al_2O_3$ mole % | Dissolution rate arbitrary units |
|---|---|---|---|
| 54.0 | 45.6 | 0.5 | 56 |
| 52.9 | 46.2 | 0.9 | 21 |
| 52.9 | 45.8 | 1.4 | 10 |
| 52.8 | 45.3 | 1.8 | 4 |
| 52.8 | 44.2 | 2.3 | 1 |
| 53.8 | 46.2 | 0.0 | 180 |

The acidity of aqueous solutions found from these glasses has been found to be given by the expression:
$[H^+] = 3.0 \times 10^{-3} \sqrt{C}$ where C is the concentration of $Zn^{++}$ in moles/liter of solution.

EXAMPLE 2

A series of glasses containing zinc oxide and phosphorus pentoxide in the molar ration 53:45 but containing various molar ratios of alumina was prepared. The dissolution rates of these materials were measured and the results are indicated in the single figure of the drawing.

The anti-corrosion glass materials described herein may be used in the form of a fine powder dispersed in a resin to form a paint. The materials may also be employed in the form of a somewhat coarser powder which is dispersed in concrete or cement to prevent corrosion of steel reinforcing rods cast therein. In other applications the material may be employed in the form of blocks which may be dropped into a water system to prevent pipe corrosion, as in the form of fibres woven into a cloth for protecting buried or immersed steel pipes from attack.

In a further embodiment the glass may include additives which enhance the action of the $Zn^{++}$ and $PO_4^{---}$ ions. Thus, for example, the presence of chromium in oxide form ($Cr_2O_3$) enhances the activity of the glass. The glass may also contain tin oxide (SnO), such as is described in our co-pending U.S. application Ser. No. 912,021 which protects the metal surface by its powerful reducing action.

What is claimed is:

1. A paint composition adapted to inhibit corrosion of a metal surface to which it is applied, the composition including a glass material dispersed in a resin carrier, in which said glass consists, as its major constituents, of phosphorus pentoxide and zinc oxide, which together provide the glass forming oxide and glass modifying oxide respectively of the glass, together with a minor proportion of one or more metal oxides selected from the group consisting of alumina, ferric oxide, gallium oxide, titanium oxide and an oxide of a metal of Group IIA of the periodic table, the composition of the glass being such that, when the glass is contacted with water, zinc and phosphate ions leach into solution.

2. A composition as claimed in claim 1 in which said resin is an acrylic resin.

3. A composition as claimed in claim 1 or 2 in which said glass comprises from 52.8 to 54.0 mole percent zinc oxide, and from 46.2 to 44.2 mold percent phosphorus pentoxide, the remainder comprising alumina.

4. A composition as claimed in claim 3 in which the molar ratio of zinc oxide to phosphorus pentoxide is 53 to 45.

5. A composition as claimed in claim 1 or 2 which includes a minor proportion of chromium oxide ($Cr_2O_3$).

* * * * *